C. REYNOLDS.
AUTOMOBILE WHEEL AND HUB.
APPLICATION FILED MAY 21, 1910.
988,815.
Patented Apr. 4, 1911.
2 SHEETS—SHEET 2.
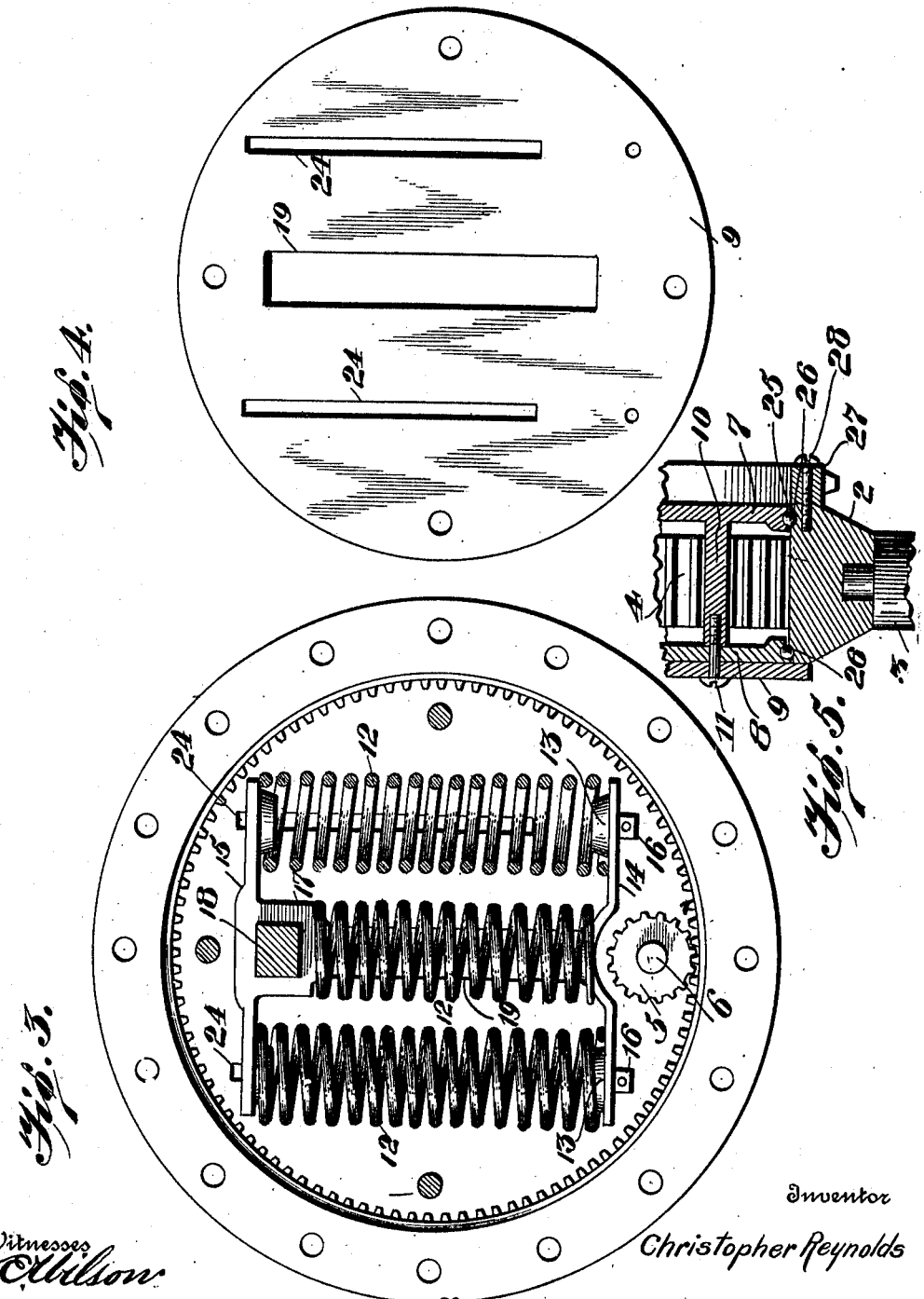
Witnesses
D. C. Wilson
Irv. L. McCathran
Inventor
Christopher Reynolds
By E. E. Vrooman,
Attorney

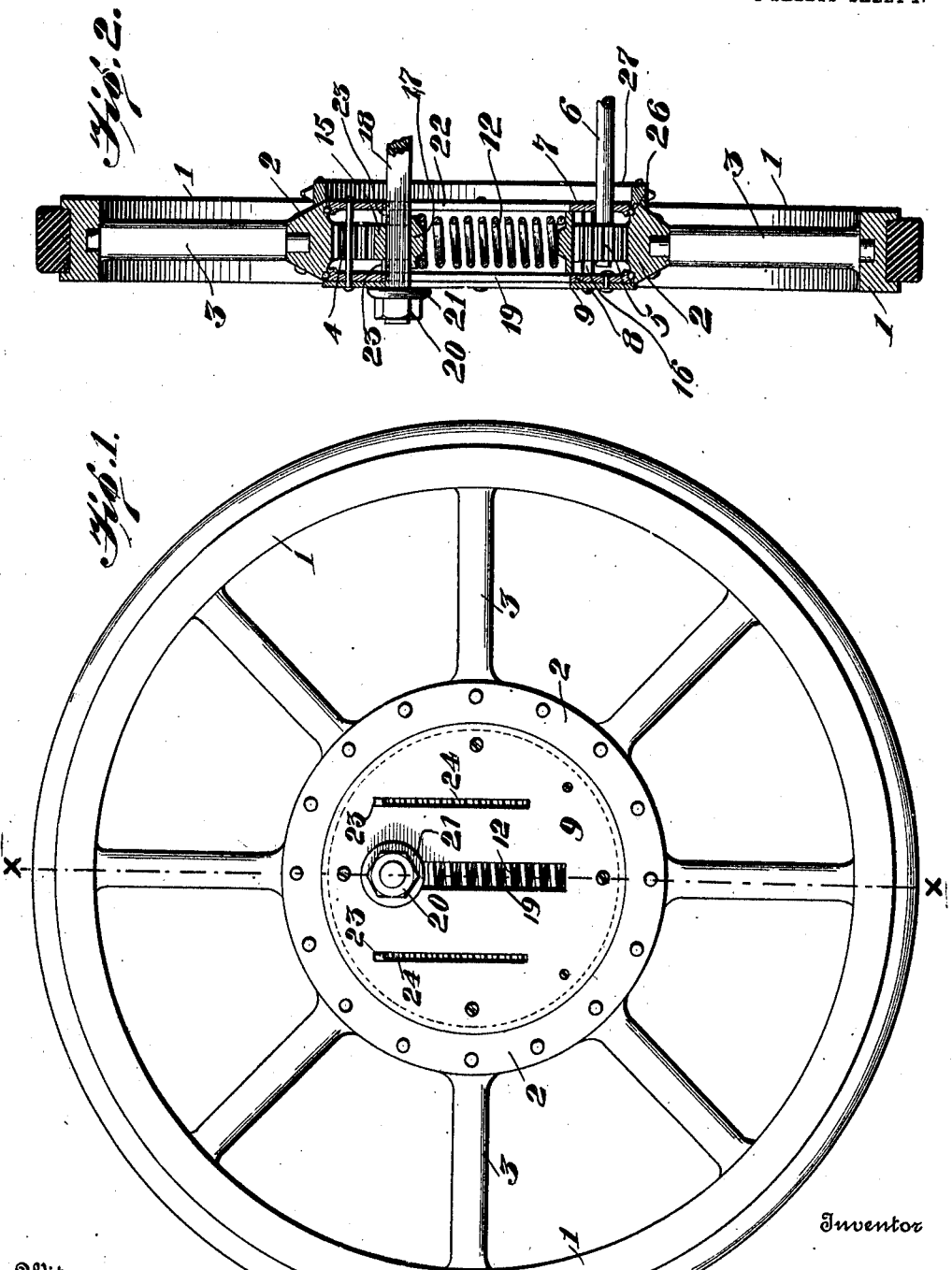

UNITED STATES PATENT OFFICE.

CHRISTOPHER REYNOLDS, OF CARLOCK, ILLINOIS.

AUTOMOBILE WHEEL AND HUB.

988,815.     Specification of Letters Patent.     Patented Apr. 4, 1911.

Application filed May 21, 1910. Serial No. 562,657.

*To all whom it may concern:*

Be it known that I, CHRISTOPHER REYNOLDS, a citizen of the United States, residing at Carlock, in the county of McLean and State of Illinois, have invented certain new and useful Improvements in Automobile Wheels and Hubs, of which the following is a specification, reference being had therein to the accompanying drawing.

This invention relates to wheels, and has especial reference to wheels for automobiles.

The invention has for its object to provide an improved wheel of this kind in which the driving wheel of an automobile has its hub provided with a cushioning device between the wheel support and the hub.

Referring to the accompanying drawing: Figure 1 is a side view of a bicycle wheel and its hub constructed in accordance with this invention. Fig. 2 is a vertical cross-section on the line $x$—$x$ of Fig. 1. Fig. 3 is a side view of the hub portion of the wheel, with one of the side plates thereof removed. Fig. 4 is a detail view of one of the side plates of the hub. Fig. 5 is an enlarged detail view in transverse section and parts broken away of a portion of the hub.

In carrying out the invention, 1 indicates the rim of a driving wheel of an automobile, and 2 an annular ring encircling the hub of the wheel, and 3 spokes having one end mounted in said annular ring, and the other in the rim 1. The internal circumference of said ring 2 is formed with teeth 4 which mesh with a pinion 5 mounted on one end of a shaft 6, connected with the driving mechanism of an automobile not shown. Inclosing said pinion and the circumferential teeth 4 on the ring 2 are plates 7 and 8 and 9, the plate 7 on the inner side having projections 10 integral therewith, extending across to the plate 8, said plates 7, 8 and 9 being secured together by screws 11 fastened through the plates 8 and 9 and into the projections 10. Inclosed between the plates 7 and 8 are a number of powerful cushioning springs 12, having their ends engaging projections 13 on cross bars 14 and 15, the cross bar 14 resting on supports 16 on the side of the plate 8 and the cross bar 15 having an enlarged portion 17 through which extends a bar 18 projecting from the automobile and serving to support the wheel; the outer end of said bar 18 projecting through a slot 19 in the plate 9 and having secured on its projecting end a nut 20 and a washer 21. The bar 18 also projects through a slot 22 in the plate 7. It will be seen that by means of this construction that when there is any vertical pounding or jumping of the wheel, the shaft 18, resting on the cushioned support afforded by the coil springs they have a vertical movement in the slots 22 and 19. The vertical movement of the frame 15 and bar 18 is further aided by projections 23 on the cross bar 15 which projects through the slots 24 in the plates 8 and 9, and have a vertical movement therein. The adjacent surfaces of the ring 2 and the edges of the plate 7 and 8 are formed with grooves 25 in which are located balls 26, thereby forming ball bearings on the annular ring 2 as the wheel is rotated by the pinion 5 on the shaft 6 engaging the teeth 4 of the ring 2.

27 indicates a toothed ring secured on the inner side of the wheel to the ring 2 in any suitable manner, as for instance, by means of screws 28, the toothed ring 27 may be utilized with a sprocket chain connected with the driving mechanism of the automobile for driving the wheels.

By means of the frame and the number of coil springs mounted thereon and inclosed and supported in the hub of the wheel a stable cushioning support is provided for the bar 18. The casing inclosing cushioning springs remains in a vertical position as the wheel rotated by the pinion 5 meshing with the ring 2 revolves about said casing and about the pinion 5.

Having described the invention, I claim:

1. A wheel of the character described, having its hub portion formed with an internally toothed ring, a fixed casing over which said ring rotates, a driving shaft, a pinion on said shaft located in said casing and meshing with said toothed ring, an axle projecting through, and vertically movable in said casing, and a cushioning device in said casing supporting said axle.

2. A wheel of the character described, having its hub portion formed of an internally toothed ring, spokes connecting said ring to the rim of the wheel, a fixed casing consisting of slotted plates having their peripheries adjacent to said ring, ball bearings between said ring and said plates, a driving shaft projecting into said casing, a toothed pinion on said shaft meshing with said toothed ring, a shaft projecting through slots in said plate and vertically movable therein, a frame in said casing mounted on said axle, and cushioning springs in said casing supporting said frame and axle.

In testimony whereof I hereunto affix my signature in presence of two witnesses.

CHRISTOPHER REYNOLDS.

Witnesses:
 ALVA SCHAD,
 A. C. WOOSLEY.

Copies of this patent may be obtained for five cents each, by addressing the "Commissioner of Patents, Washington, D. C."